United States Patent [19]

Schenten

[11] Patent Number: 4,678,240
[45] Date of Patent: Jul. 7, 1987

[54] REAR SPRING ACTUATED BRAKE PROPORTIONER

[75] Inventor: James L. Schenten, Sterling Heights, Mich.

[73] Assignee: Chrysler Motors Corporation, Highland Park, Mich.

[21] Appl. No.: 844,659

[22] Filed: Mar. 27, 1986

[51] Int. Cl.$^4$ .......................... B60T 13/04; B60T 8/22
[52] U.S. Cl. .................................. 303/6 C; 303/22 R
[58] Field of Search .................. 303/6 C, 6 M, 22 R; 188/195, 349; 267/54 R

[56] References Cited

U.S. PATENT DOCUMENTS

| | | | |
|---|---|---|---|
| 2,498,438 | 2/1950 | Levesque | 188/195 |
| 2,523,057 | 9/1950 | Ransom | 188/195 |
| 3,149,886 | 9/1964 | Dorner | 303/22 R |
| 3,199,928 | 8/1965 | Chouings | 303/22 R |
| 3,442,557 | 5/1969 | Oberthur | 303/22 R |
| 3,460,871 | 8/1969 | Keller et al. | 303/22 R |
| 3,512,845 | 5/1970 | Farmery et al. | 303/22 R |
| 3,684,329 | 8/1972 | Kawabe et al. | 303/22 R |
| 3,884,532 | 5/1975 | Deschenes | 303/22 R |
| 3,927,916 | 12/1975 | Masuda | 303/22 R |
| 3,936,097 | 2/1976 | Yanagawa et al. | 303/22 R |
| 3,975,062 | 8/1976 | Giordano | 303/22 R |
| 4,012,079 | 3/1977 | Takeshita | 303/6 C |
| 4,060,283 | 11/1977 | Demido et al. | 303/6 C |
| 4,090,740 | 5/1978 | Farr | 303/22 R |
| 4,111,495 | 9/1978 | Peeples | 303/6 C |
| 4,150,855 | 4/1979 | Demido | 303/22 R |
| 4,325,581 | 4/1982 | Pickering | 303/22 R |
| 4,445,725 | 5/1984 | Sivulka | 303/6 C |
| 4,606,584 | 8/1986 | Kowal et al. | 303/6 C X |

FOREIGN PATENT DOCUMENTS 957878  5/1964  United Kingdom .

Primary Examiner—Andres Kashnikow
Assistant Examiner—Robert J. Oberleitner
Attorney, Agent, or Firm—Kenneth H. MacLean, Jr.

[57] ABSTRACT

An improved vehicle load sensing mechanism for a brake proportioning system including a suspension spring follower lever. The follower lever is mounted co-axially with a leaf-type spring mounting fastener and utilizes a low-friction sleeved bearing assembly to thereby exactly duplicate pivotal movements of the spring end caused by road irregularities without creating significant force levels between portions of the lever and the end of the spring.

3 Claims, 4 Drawing Figures

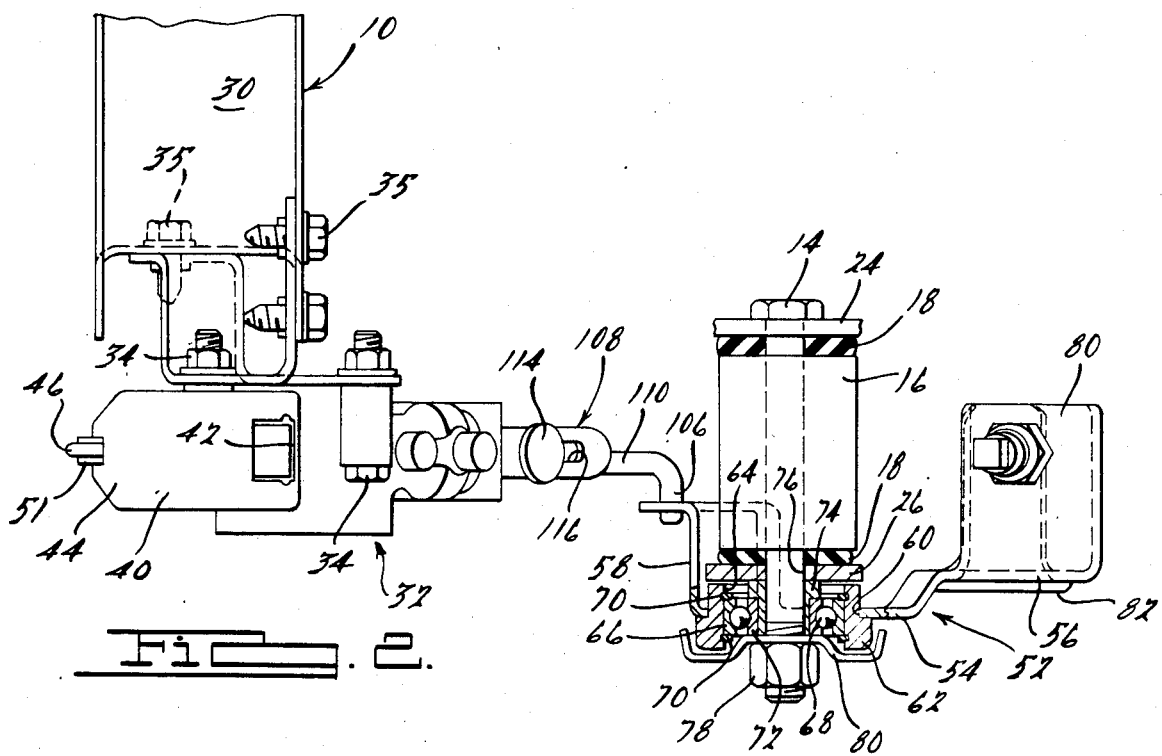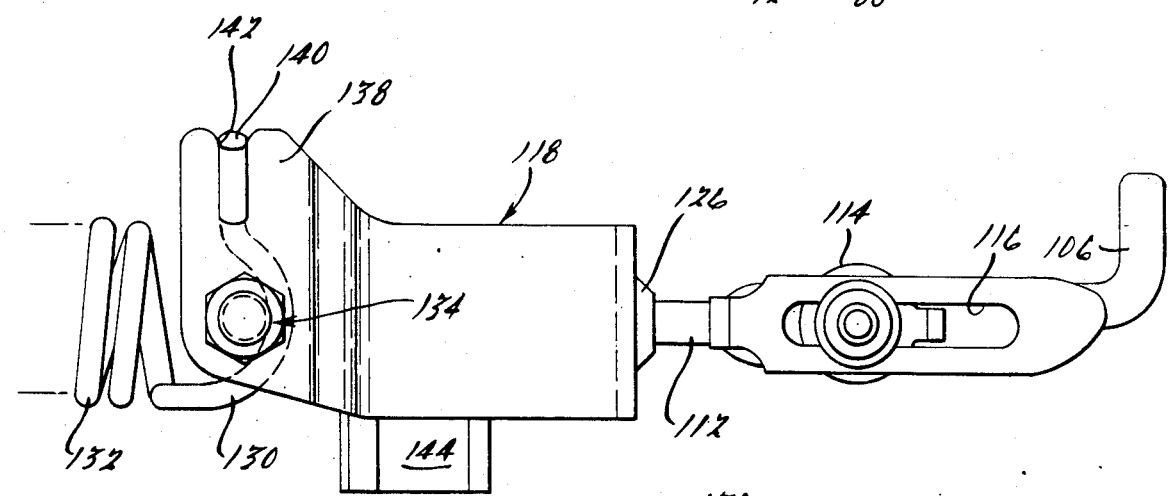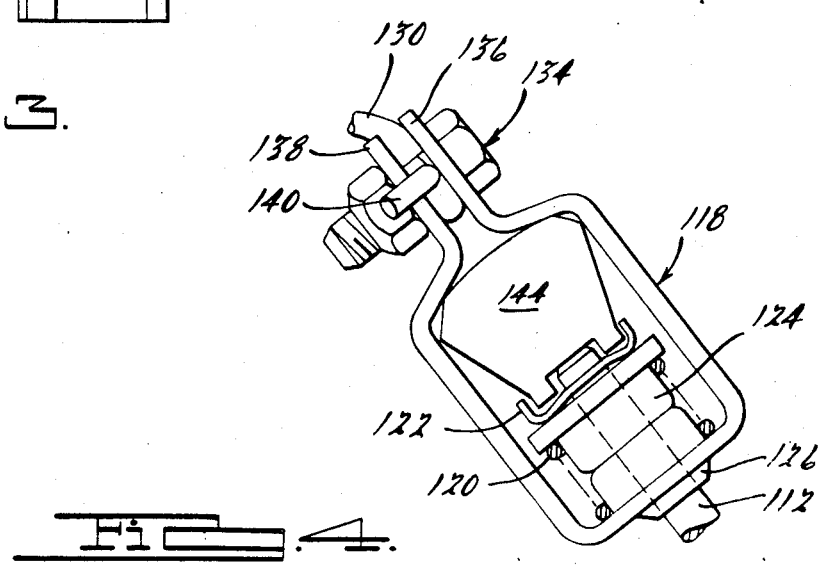

REAR SPRING ACTUATED BRAKE PROPORTIONER

CROSS REFERENCES TO RELATED APPLICATIONS

This application is an improvement in the brake proportioners which are the subjects of co-pending U.S. application Ser. No. 686,359 filed Dec. 26, 1984, and entitled "Rear Spring Actuated Brake Proportioner", now U.S. Pat. No. 4,583,789 issued on Apr. 22, 1986; and of U.S. application Ser. No. 809,087 filed Dec. 16, 1985, and entitled "Rear Spring Actuated Brake Proportioner", now U.S. Pat. No. 4,650,258. The sole inventor of the subject application is also the sole inventor of the prior parent applications.

BACKGROUND OF THE INVENTION

1. This invention relates to vehicle hydraulic brake systems and, more particularly, to a hydraulic brake system utilizing a proportioning valve which responds to the load of the vehicle to vary the braking effort produced by the rear wheel brake components.

2. Prior use of a rear brake proportioning valve in a hydraulic braking system include the 1984–85 Chrysler Corporation built T-115 Van and Wagon, sold under the names: Plymouth "Voyager" and Dodge "Minivan" or "Caravan." In these vehicles, a proportioning valve in the hydraulic brake system is mounted to a body member slightly forward of the rear axle and slightly to the left of the vehicle center line. A connector assembly is attached to the rear axle rightwardly of the proportioning valve. The connector includes an elongated tension type spring extending between the axle and the input of the proportioning valve. When the vehicle is lightly loaded, the relative positions of the axle and the proportioning valve produces a relatively slight extension of the spring. As the vehicle load increases, particularly near the rearward portion of the vehicle, the extension of the tension spring is increased as the vehicle body moves downward with respect to the axle. Resultantly, the spring exerts an increased force input on the proportioning valve which results in the valve directing an increased brake fluid pressure to the brake components of the rear wheels for greater rear braking effort.

The aforedescribed brake system operates quite satisfactorily. However, the mid-axle location of the valve and connector assembly is not always convenient on other vehicles due to space considerations and interference with the body and other components. Also, a spare tire stored immediately to the rear of the brake proportioning components and the above described arrangement results in crowding. It would be desirable to locate the brake proportioning components elsewhere to permit better accessibility of the spare tire and greater flexibility in available spare tire dimensions.

The subject invention which is described in more detail hereinafter concerns an improved hydraulic brake system with a relocated proportioning valve responsive to vehicle loading. The proportioning valve and related components are relocated to a more desirable position in front of the rear suspension spring. Therefore, other means are provided to sense and transmit vehicle loading.

The above identified Chrysler Corporation brake system is generally related to the subject invention. Other related patents are discussed hereinafter. U.S. Pat. Nos. 4,150,855 and 4,325,581 relate to a load responsive brake proportioning valve for brake systems, but are specifically designed for use with coil type suspension springs of a vehicle. In both of the devices, the brake proportioning device is configured and arranged to be mounted mostly within the central portion of the coil spring of the vehicle suspension. Both devices receive force inputs directly from the suspension spring through levers 64 and 66 in the U.S. Pat. No. 4,150,855 and through resilient or elastomeric members in the U.S. Pat. No. 4,325,581.

U.S. Pat. No. 3,975,062 discloses a device responsive to vehicle deceleration for modifying brake action. The deceleration valving device is connected by linkage to an anti-roll bar to respond to suspension related conditions of the vehicle.

U.S. Pat. Nos. 2,498,438; 3,460,871; 3,884,532; and 4,012,079 disclose brake proportioning systems using a proportioning valve responsive to movement of a suspension spring, particularly of the leaf type construction commonly used in association with the rear axle of a vehicle. In addition, the British Pat. No. 957878 assigned to Daimler-Benz discloses a brake proportioning system utilizing a lever pivoted at its midpoint with a first arm connected to an end portion of the leaf spring and with a second arm operating a fluid valve.

There are other brake proportioning devices which are generally relevant to the subject application. The following patents are in this category: U.S. Pat. Nos. 2,523,057; 3,149,886; 3,199,928; 3,512,845; 3,684,329; 2,927,916; 3,936,097; 4,060,283; 4,090,740; and 4,445,725. A common feature of these patents is a brake modifying device directly responsive to axle position. It is not believed that these patents are more relevant to the subject invention of this application than the above-described Chrysler system utilized on the T-115 vehicle.

SUMMARY OF THE INVENTION

It is desirable to locate a brake proportioning valve in a protected location. Such a location is found just forward of the rear wheel and adjacent the forward end portion of the rear leaf type suspension spring. At this location, the forward end of the leaf spring is pivotally connected to the sprung portion of the vehicle. In the subject application, the brake proportioning valve is mounted on the sprung portion of the vehicle. The proportioning valve includes related force input means which sense vehicle loading via the angular position of the adjacent spring end. Thus, as the vehicle load increases, the spring end pivots through an arc as the sprung portion of the vehicle moves downward with respect to the mid-portion of the spring which is maintained a substantially constant distance relative to the road surface.

The subject force input means for the proportioning valve includes a spring position or follower member which engages the end portion of the leaf spring a short distance from the pivotal support of the leaf spring. Thus, the spring follower is moved as the spring angulates due to changes in loading of the vehicle. The follower is connected to the force input of the proportioning valve by an extended spring-like axial connector. As the follower pivots in response to loading of the vehicle, the force input on the proportioning valve is changed via the connector. The follower is desirably maintained in close contact with the end portion of the leaf spring by a yieldable control device which also contacts the end portion of the leaf spring.

The aforedescribed brake proportioning system and spring follower mechanisms are adapted to accurately teach the angular pivoting of the spring end portion. It is desirable to provide a pivotal following mechanism that nearly effortlessly moves with the spring end. Significant frictional resistance to pivotal movement produces an undesirable force between the elastomeric mechanism wear pads and the spring which leads to a shorter lifespan of the device. This frictional resistance can be particularly prevalent during normal flexing of the spring caused by road surface irregularities during travel.

Accordingly, the subject improved mechanism utilizes a low friction bearing housed in an insert mounted housing to significantly reduce undesirable frictional events.

Also disclosed in the subject application is a system for pre-adjusting the spring follower mechanism and brake proportioner. The system utilizes a yieldable connector with a heavy spring and a lighter spring between the proportioner valve input and the follower mechanism. A spacer block between a portion of the connector housing and the ligher spring compresses the spring. The device can then be installed on a normally loaded vehicle and the spacer block then removed. Consequently, the connector will correctly establish the desired relationship between the spring follower and the force input of the proportioner.

Consequently, an object of the invention is to provide an improved vehicle brake proportioning system including a load responsive input means for a proportioning valve which directly senses angular movements of the vehicle rear leaf type suspension spring and moves nearly effortlessly with the rapid spring movements caused by road irregularities.

A further object of the invention is to provide an improved vehicle brake proportioning system utilizing load responsive input means to a proportioning valve which input means is moved by pivotal action of the leaf type rear suspension spring as the vehicle load changes. The resultant positioning of the load responsive input means exerts a force input to one end of an axially yieldable, dual spring connector, the other end of which directs an input force on the proportioning valve. Adjustment means including a spacer block to compress the lighter spring of the two permits the assembly to be installed on a lightly loaded vehicle and, subsequently, to be removed, thus establishing desirable relationships between portions of the system.

Other objects and advantages of the subject invention will be more readily apparent from a reading of the following Detailed Description of Preferred Embodiments, which are shown in the following drawings.

BRIEF DESCRIPTION OF THE DRAWINGS

FIG. 2 is a partial planar view of the assembly shown in FIG. 1;

FIG. 3 is an enlarged view of the connecting means between the load sensing component and the proportioning valve shown in FIG. 1 and looking in the direction of arrow A; and FIG. 4 is an enlarged view of the connector means shown in FIG. 3 showing a removable adjustment spacer block in place.

DESCRIPTION OF THE PREFERRED EMBODIMENTS

Figure 1:
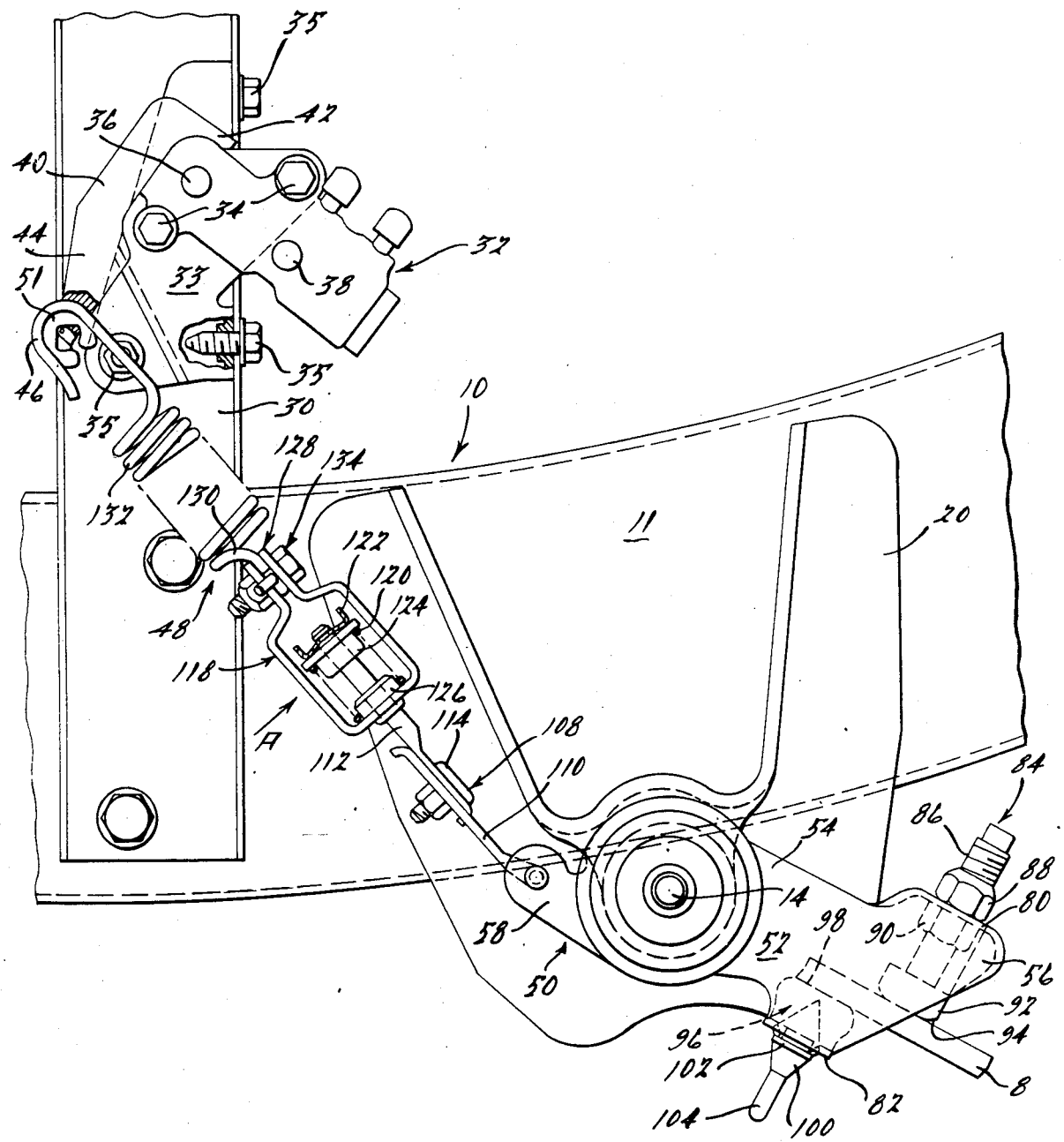
FIG. 1 is a partial elevational view of a vehicle frame member supporting a proportioning valve and a suspension spring end with an associated load sensing mechanism.

A vehicle brake system to which the subject proportioning system applies is well known. An example is the aforementioned 1984-85 T-115 vehicles. In the known brake system, a master brake cylinder receives a braking input from a vehicle operator via a pedal to generate brake activating hydraulic fluid pressure. The fluid pressure is transmitted by means of conduit means to the vehicle front wheel brake components. Rear brake components are connected to the master brake cylinder by conduit means. The subject proportioning valve is inserted between the master cylinder and rear brakes. The proportioning valve is a known device which has been previously used on automobiles for the purpose of changing the brake effects of the rear wheel brake components relative to the front brakes as desired. In the subject brake system, the proportioning valve is responsive to vehicle loading by means of sensing the angular position of the end portion of a rear leaf type suspension spring.

The forward end portion 8 of the rear leaf type suspension spring is pivotally mounted to a sprung portion 10 of the vehicle as shown in FIG. 1. The vehicle rear axle (not shown) is attached to a midpoint of the spring and is a part of the unsprung portion of the vehicle. Changes in vehicle loading, particularly adjacent the rear axle, cause the sprung portion 10 of the vehicle to move vertically relative to the rear axle. With increased loading of the vehicle, the sprung portion 10 and the spring end move downward with respect to the axle. This causes the end portion of the spring to pivot in a counter-clockwise manner. When the vehicle load is decreased, the sprung portion 10 of the vehicle moves the spring end 8 upward with respect to the axle and thereby causes the end portion 8 to pivot angularly clockwise. The subject improved braking system provides a force input to a proportioning valve in response to these angular movements of the leaf spring.

In FIGS. 1 and 2, a longitudinally extending (fore and aft) vehicle frame member 11 is illustrated. That portion of frame 11 which is illustrated is forward of the rear axle (not shown). The rear axle is attached to the vehicle by springs of leaf type construction. A forward end portion 8 of the leaf spring is shown in FIG. 1. The forward end is formed into a loop 16 (see FIG. 2) and is pivotally supported by a fastener means 14. An elastomeric bushing 18 is surrounded by the looped end 16 of the spring 8 and has a central aperture forming sleeve therethrough for fastener 14. The fastener means 14 extends through an eye portion or the loop 16 and between spaced portions of bracket means 20 which is attached to the frame member 11. Specifically, the bracket means 20 includes a wall portion 24 which is outwardly offset from the frame member 10 and which engages one end of the fastener 14. Another outwardly offset wall portion 26 supports the other end of the fastener 14.

The leaf spring assembly is commonly utilized in rear suspension of both front and rear-wheel drive type vehicles. As is well known, an increased load or cargo in vehicles causes the sprung weight 10, such as frame 11, and the attached end portion 8 of the spring to move downward with respect to the mid-portion of the spring which is attached to the unsprung portion or axle. In FIG. 1, the vehicle is in a lightly loaded condition. As the vehicle load is increased, the leaf spring assembly is generally straightened and the spring end 8 will be pivoted in a counter-clockwise direction about fastener 14.

It is desirable to provide brake proportioning in vehicles which are subject to relatively large variations in loading. The proportioning system produces decreased braking capacity of the rear wheels when the vehicle is lightly loaded and increased rear braking capacity when the vehicle load is increased. As shown in FIGS. 1 and 2, a brake proportioning valve assembly 32 is mounted on a vertical frame member 30 in a position upward and forward of the spring end portion 8. Specifically, the brake proportioner 32 is attached to a bracket 33 by fasteners 34. Bracket 33 is attached to frame member 30 by fasteners 35. Valve 32 includes a brake fluid inlet 36 to receive pressurized fluid from the master cylinder pressure generator of the vehicle. It also includes fluid outlet means 38 which are connected to the rear brake components.

Brake proportioning valves similar to assembly 32 have been utilized on vehicles previously. The interior parts and functional operation thereof is known. Basically, the brake proportioner valve is an input force responsive device having valve components for regulating fluid pressure. The fluid pressure received through the inlet is regulated and directed to the rear wheel brake components of the vehicle. A lever-like input actuator 40 is pivotally attached at its upper end 42 to one corner of the valve 32 where it may pivot thereabout. A lower portion 44 of lever 40 is operably connected by a hooked end portion 46 to a spring connector assembly 48. Spring connector assembly 48 extends from the lever end 44 to a rear suspension spring follower assembly 50. To promote smooth engagement between the hooked end portion 46 and the lever end 44, a contoured sleeve member 51 is utilized therebetween.

The connector assembly 48 extends between the input lever 40 and the spring follower assembly 50. As best shown in FIG. 2, the spring follower assembly 40 includes a stamped metal member 52 having a mid-portion 54, a rearwardly extending arm 56 and a forwardly extending arm 58. The mid-portion 54 has an aperture 60 therethrough which receives a bearing sleeve 62. The sleeve 62 is insertably installed within aperture 60 in a generally press or interference type fit.

The sleeve 62 has a cylindrical bore 64 therethrough which surrounds the outer housing 66 of a ball bearing assembly which includes a plurality of friction reducing ball bearings 68. The outer housing 66 is axially restrained in the bore 64 by a pair of radially outwardly expandable retainers 70 which are received within a pair of grooves in housing 66.

The ball bearing assembly also includes an inner housing 72 which has an inner diameter aperture. A sleeve 74 extends into the inner diameter aperture of the housing 72 for supporting the housing. A bore 76 in sleeve 74 encircles the lower end of elongated fastener 14 as shown in FIG. 2. A nut type retainer 78 is threaded to the fastener 14 and is tightened against an end cover or washer 80. This presses the sleeve 74 in end seating relationship with the portion 26 of spring support bracket 20.

The outer and inner bearing housings 66 and 72 form a ball race therebetween in a conventional form for the plurality of ball bearings 68. This provides a nearly frictionless pivotal movement between a stationary inner housing 72 and rotatable outer housing 66. Thus, follower member 52 is free to pivot about the axis of fastener 14.

The pivotal movement of follower 52 about the axis of fastener 14 is produced by identical pivotal movement by the spring end 8 as can be determined by examination of FIGS. 1 and 2. Specifically, the spring follower 52 includes the rightwardly extending arm portion 56 which extends rearwardly with respect to the vehicle from the mid-portion. The arm 56 includes a pair of extensions 80 and 82 turned normally from the plane of arm 56 and extending in parallel spaced relation to one another. The extensions 80 and 82 are so configured and spaced so that one extends above the surface of the spring end 8 and, likewise, one extends beneath the surface of the spring end 8. The upper extension 80 supports a spring contact means 84, best shown in FIG. 1. The spring contact means 84 includes an elongated threaded body member 86 which is axially attached to extension 80 by means of two nut fasteners 88 and 90. The fasteners 88 and 90 are moved toward one another to capture the extension 80 therebetween when the end of body 86 is in a desirable axial location relative to spring end 8. The lower end of the body member 86 carries a spring contacting member 92 which has a curved contact surface 94 to engage the upper surface of the spring end portion 8.

The lower extension 82 of arm 56 extends beneath spring end 8. Extension 82 supports an elastomeric bumper member 96 having a generally bulb shaped portion 98 which engages the lower surface of the spring end 8. A depending neck portion 100 of bumper 96 extends through an aperture in extension 56 and has an enlarged portion 102 which bears against the lower surface of extension 56 to secure the bumper member to the extension. The narrow stem portion 104 of the bumper is for the purpose of installing the bumper. It is inserted through the aperture and then pulls the enlarged portion 102 through the aperture to seat a narrowed portion in the aperture.

It can be readily understood that the nut fasteners 88 and 90 can be adjusted on body 86 to move the contact 92 against the upper surface of the spring end portion 8. A desired relationship therebetween exists when the head portion 92 presses against the spring end 8 sufficiently so that the elastic portion 98 of the bumper 96 is compressed and flattened slightly. This relationship to the surfaces of the spring end 8 enables the spring follower mechanism to track pivotal movements of the spring end 8 as it moves due to changes in vehicle loading and due to dynamic fluctuations.

The leftwardly extending arm 58 of follower 52 projects forwardly with respect to the vehicle and is attached to the lower end of the yieldable connector 48 as seen in FIG. 1. Specifically, the arm 58 is attached to a curved end portion 106 of an adjustably extendable member 108. Member 108 is composed of overlying members 110 and 112 which are secured together by a fastener 114. An elongated slot 116 (see FIG. 2) allows considerable adjustment between strap parts 110, 112. Strap 112 extends into a spring cage housing 118 and through the central portion of a coil type spring 120. Strap 112 supports a retainer 122 and spring seat 124 so that when strap 112 moves axially out of cage housing 118 through an aperture in a second spring seat 126, the spring 120 is axially compressed. This movement corresponds to increased loading of the associated vehicle.

The upper end 128 of the caged housing 118 is clampingly attached to one end 130 of a relatively heavy spring 132 by a bolt and a nut fastener 134. The bolt and nut fastener 134 specifically clamps a hooked end 130 of the spring 132 between end portions 136, 138 of housing 118. The hooked end 130 is further formed at 140 to engage notch 142 in the end 138.

As shown in FIGS. 3 and 4, a spacer block 144 preferably of elastomeric material is slipped into housing 118 to compress spring 120 and so that seat members 124, 126 are essentially in contact. In this pre-assembly condition, the assembly is ready for fitting onto the vehicle. If the vehicle is normally loaded (no extra load in the rear), tightening of fastener 114 to adjust the relationship of straps 110 and 112 will produce a desirable adjustment of the system when the spacer block 144 is subsequently removed from housing 118.

OPERATION OF THE BRAKE PROPORTIONER

When a vehicle such as a truck is lightly loaded, vehicle braking is more efficient when the front brakes assume a larger share of the braking capacity. Conversely, when a vehicle is more heavily loaded, increased braking efforts of the rear wheels provide more efficient stopping power. The subject load sensing and brake proportioning system operates in conjunction with an otherwise conventional braking system including a hydraulic master brake control which generates a brake fluid pressure level for both front and rear brakes. In the subject brake system, a brake proportioning valve is responsive to the degree of vehicle loading.

The embodiment shown in FIGS. 1 and 2 utilizes the same type of proportioning valve which has been in use on the 1984-85 T-115. The valve operation is essentially the same as described previously. The primary feature of this application is provided by the particular manner of supporting spring follower 52 on the fastener 14. The coaxial support arrangement assures identical angular movements of the spring end 8 and of the follower 52. Resultantly, engagement between the contact surface 94 and the upper surface of spring end 8 is relatively localized without sliding movement therebetween. Likewise, the engagement between the contacting surface of the bulb 96 and the surface of the spring end 8 does not involve relative sliding therebetween the parts. Consequently, there is very little wear.

As the associated vehicle is more heavily loaded, the spring end portion 8 moves angularly counter-clockwise toward a more flat position from the upwardly curved position shown in FIG. 1. Resultantly, the arm portion 56 of the follower 50 pivots upward and moves the follower 50 about the axis of the fastener 14. This counter-clockwise movement generates an increased force input to the brake proportioner valve 32 via the spring connector assembly 48. During transient flexing of the spring's end portion 8, the spring follower 50 oscillates fairly rapidly about the axis of the fastener 14. This generates an alternating compression and relaxation of the weaker spring 120 within the connector assembly 48. The relative weak spring 120 accommodates relatively high frequency and low amplitude flexing of the follower mechanism caused by transient conditions such as highway irregularities. The low friction bearing between the fastener 14 and the follower 50 readily accommodates this high frequency, low amplitude flexing to prevent undue surface pressures from developing between the spring and the follower parts. Because of the coaxial mounting of spring end 8 and follower 50 with the low friction bearing, and in association with the cushioning action of the bumper 96, the transient movements of the spring end 8 are tracket accurately without undesirable heavy sliding action between the spring surface and the follower.

Although two basic embodiments of the subject improved brake system with a spring follower mechanism have been illustrated and described in detail, modifications thereto are contemplated which fall within the scope of the invention as claimed hereafter.

I claim:

1. In a vehicle, a brake and suspension system including a leaf-type rear spring between sprung and unsprung portions of the vehicle with at least one end portion attached to the sprung portion of the vehicle for pivotal movements thereabout, a master brake fluid pressure control means for selectively generating desired levels of brake fluid pressure for transmission to brake components associated with each wheel, a proportioning valve means fluidly connected between the master brake control and the rear wheel brake components to regulate the pressure level of brake fluid transmitted to rear brake components and having a force input thereto responsive to loading of the vehicle for controlling the proportioning valve and including an improved vehicle load responsive sensing means, comprising:

an elongated follower lever having first and second end portions and a mid-portion with an aperture therethrough;

means for pivotally mounting both the one end portion of the spring and the mid-portion of the lever in coaxial relation to one another;

spring contact means supported by the first end portion of the lever follower with a contact surface thereof engaging one face of the spring's end portion;

a deformable elastomeric bumper supported by the first end portion of the follower lever and contacting the opposite face of the spring's end portion;

the spring contact means and the deformable elastomeric bumper being spaced with respect to one another and contacting the two faces of the spring end portion respectively so that the contact surface is firmly held against the face of the spring's end portion even as the spring end pivots about the mounting means;

the pivotal mounting means for the mid-portion of the follower lever including a generally tubular sleeve member adapted to be securely mounted within the aperture of the follower lever;

a low-friction bearing means having outer and inner housing portions rotatable with respect to one another and supporting rollable elements therebetween;

the outer housing portion being secured to the tubular sleeve and the inner housing portion being supported by the spring end fastening means so that the housing portions are coaxial with the support of the spring end portion whereby relatively rapid pivotal movements of the spring end portion caused by road bumps are nearly effortlessly transmitted to the follower lever through the spring contact means and elastomeric bumper;

an elongated and yieldable connecting means between the second end portion of the lever and the input of the proportioning valve to generate and transmit a force input to the proportioning valve input in response to angular movements of the spring's end portion and the lever.

2. In a vehicle, a brake and suspension system of the type including a leaf-type rear spring between sprung and unsprung portions of the vehicle with at least one end portion attached to the sprung portion of the vehicle for pivotal movements thereabout, a master brake fluid pressure control means for selectively generating desired levels of brake fluid pressure for transmission to brake components associated with each wheel, a proportioning valve means fluidly connected between the master brake control and the rear wheel brake components to regulate the pressure level of brake fluid transmitted to the rear brake components and further having a force input thereto responsive to loading of the vehicle to control the proportioning valve, an improved vehicle load responsive sensing means, comprising:

an elongated follower lever with first and second end portions and a mid-portion with an aperture therethrough;

an elongated fastener means for pivotally mounting both the one end portion of the spring and the mid-portion of the lever in coaxial and side-by-side relation to one another;

the fastener means including a bolt supported by the vehicle sprung portion and a first cylindrical body portion supporting the one end of the spring, the bolt having an integral second cylindrical portion extending through the aperture of the follower lever to support the lever in coaxial relation to the one end of the spring;

axially adjustable security means adapted to move on the second cylindrical portion of the bolt fastener;

spring contact means supported by the first end portion of the follower lever with a contact surface thereof engaging one surface of the end portion of the spring;

a deformable elastomeric bumper also supported by the first end portion of the follower lever contacting an opposite second surface of the end portion of the spring to maintain a firm bearing relationship between the contact means and the one spring surface even as the spring end pivots about the bolt spring support;

a tubular sleeve member with an outer diameter surface engaging the apertured portion of the follower lever's mid-portion for unitary movement;

a low friction bearing means having outer and inner housing portions rotatable with respect to one another and supporting a plurality of spherical roller elements therebetween;

the outer bearing housing being supported within the tubular sleeve in a manner for unitary movements;

the inner bearing housing encircling the second cylindrical portion of the bolt and being axially secured with respect to the spring end portion by the axially adjustable security means whereby relative rapid pivotal movements of the spring end portion caused by road bumps are nearly effortlessly transmitted to the follower lever through the spring contact means and elastomeric bumper;

an elongated and yieldable connecting means between the second end portion of the lever and the input of the proportioning valve to generate and transmit a force input to the proportioning valve input in response to common angular movements of the spring's end portion and the lever.

3. The improved load sensing means of claims 1 or 2 in which the yieldable connecting means includes two springs in series connection, a first spring having a relatively stiff spring rating and a second spring having a relatively light spring rating;

the second spring being supported in an open sided housing in a manner permitting access thereto for pre-stressing the spring prior to assembly to the vehicle;

means extending through the open side of the housing to pre-stress the second spring prior to attachment of the connecting means on the vehicle, whereby the pre-stress means are removed from contact with the spring through the open side of the housing after assembly.

* * * * *